United States Patent [19]

Fischer et al.

[11] Patent Number: 4,993,894

[45] Date of Patent: Feb. 19, 1991

[54] DRILL

[75] Inventors: Artur Fischer, Tumlingen; Willi Haug, Freudenstadt, both of Fed. Rep. of Germany

[73] Assignee: Fischerwerke Artur Fischer GmbH & Co. KG, Waldachtal/Tumlingen, Fed. Rep. of Germany

[21] Appl. No.: 485,439

[22] Filed: Feb. 27, 1990

[30] Foreign Application Priority Data

Feb. 27, 1989 [DE] Fed. Rep. of Germany ....... 3906036
Mar. 4, 1989 [DE] Fed. Rep. of Germany ....... 3907088

[51] Int. Cl.⁵ ............................................. B23B 51/00
[52] U.S. Cl. ..................................... 408/14; 408/113; 408/143; 408/202
[58] Field of Search ...................... 408/241 S, 14, 113, 408/143, 147, 180, 187, 202

[56] References Cited

U.S. PATENT DOCUMENTS

| | | | |
|---|---|---|---|
| 2,223,485 | 12/1940 | Eveleth | 408/202 |
| 2,429,375 | 10/1947 | Smith | 408/113 |
| 2,700,905 | 2/1955 | Urquhart | 408/113 |
| 4,010,807 | 3/1977 | Fischer | 408/202 |

FOREIGN PATENT DOCUMENTS

| | | | |
|---|---|---|---|
| 171830 | 2/1986 | European Pat. Off. | 408/202 |
| 2547412 | 11/1976 | Fed. Rep. of Germany | 408/241 S |
| 8221158 | 2/1983 | Fed. Rep. of Germany | |
| 3515960 | 3/1985 | Fed. Rep. of Germany | |
| 2035184 | 6/1980 | United Kingdom | 408/143 |

Primary Examiner—Daniel W. Howell
Attorney, Agent, or Firm—Michael J. Striker

[57] ABSTRACT

A drill for drilling holes in masonry and comprising a depth stop mounted on the drill shank and formed as a resilient anti-vibration element.

8 Claims, 2 Drawing Sheets

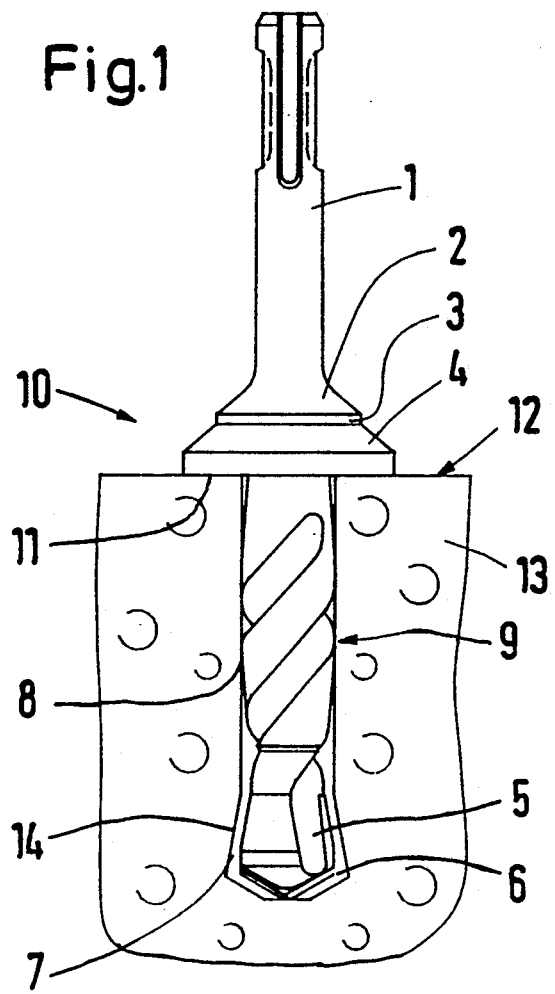
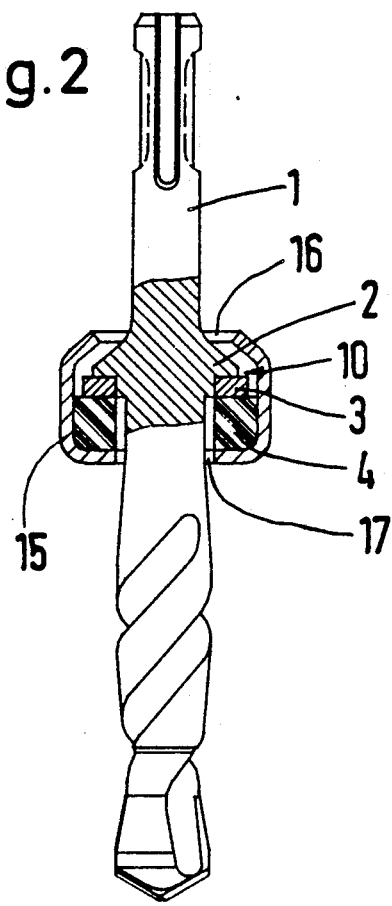
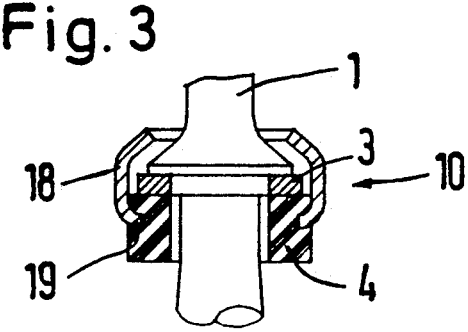

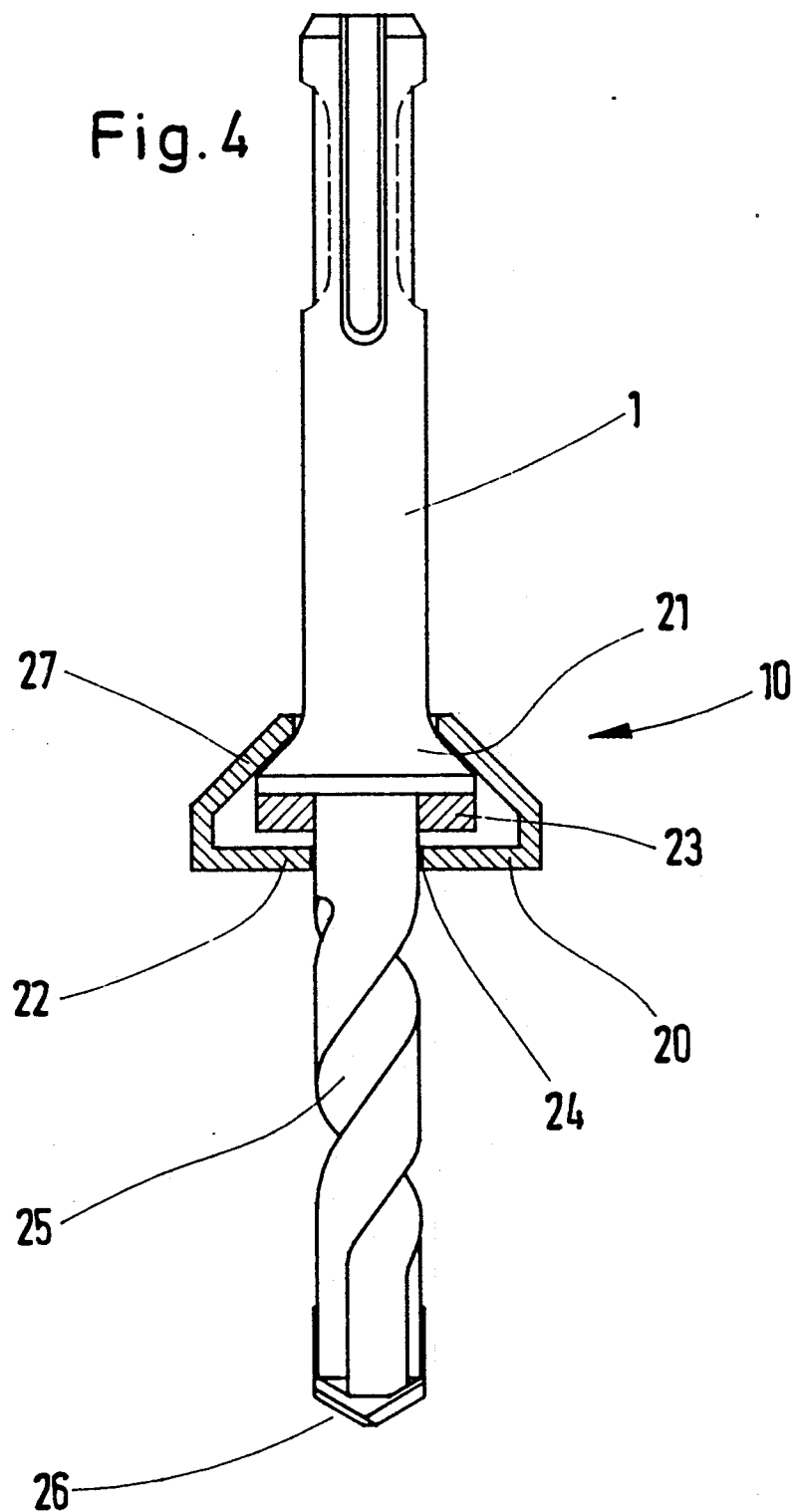

DRILL

BACKGROUND OF THE INVENTION

The invention relates to a drill with a depth stop arranged on the drill shank.

In order to produce drilled holes, the depth of which is to be accurately maintained, drills with a depth stop arranged on the drill shank are used. As a depth stop, an integrally molded collar can be used. However, when using a hammer drill, as the collar strikes against the wall surface, it may cause damage in the region of the mouth of a drill hole. To produce drilled holes with an undercut at the bottom of the drilled hole, it is preferred to use drills, the drill tip of which has lateral cutting edges that project laterally beyond the drill shank. Such drills can be chucked in hammer drill means and are used to produce the drilled hole and the undercut. A depth stop supported on the drill shank restricts the depth to which the drill can penetrate. Generally, a collar integrally formed with the drill shank serves as a depth stop. But when the collar comes into contact with the wall surface, it strikes the wall surface and may cause breaking of the mouth of the drilled hole. During the swivelling operation, which is necessary for reaming out the undercut at the bottom of the drilled hole, particular consideration has to be paid to the fact that the depth stop is positioned against the wall surface of the masonry as damage to the wall surface can be caused by a rigid depth stop.

SUMMARY OF THE INVENTION

The object of the invention is a drill the depth stop of which does not damage the region of the mouth of the drilled hole.

The object of the invention is achieved by providing a depth stop comprising a resilient anti-vibration element. Because the depth stop comprises a resilient anti-vibration element, damage to the wall surface in the region of the mouth of the drilled hole, which may be caused by a rigid depth stop, is avoided.

In a preferred embodiment of the drill according to the invention, the depth stop comprises a resilient, ring-shaped anti-vibration element, which preferably is formed of polyurethane or a corresponding plastic material. As the depth stop positions itself against the wall surface, the anti-vibration element is located between the wall surface and a collar integrally formed with the drill shank, and absorbs the impacts caused by the hammer drill means. Besides, the anti-vibration element has sufficient resilience for the depth stop to abut the wall surface along its entire surface, in particular during the swivelling movement of the drill as an undercut of the drilled hole is formed. During the swivelling movement, the anti-vibration element is alternatively resiliently deformed in accordance with the swivelling movement, but the contact face of the depth stop lying against the wall surface does not change its position. The anti-vibration element has, therefore, not only the advantage that the wall surface sustains no damage, but also the advantage that an optimum contact area of the depth stop with the wall surface is maintained during reaming out the undercut.

Between the anti-vibration element and the collar integrally formed with the drill, there is provided a bearing washer which substantially reduces the friction between the rotating collar and the anti-vibration element which, because of its contact with the wall surface, does not rotate with the collar. The bearing washer can be formed as a metal washer or may be formed of a plastic material with good sliding properties.

The anti-vibration element can be secured against axial displacement on the shank by a casing engaging over the collar formed on the drill shank. The casing may also completely enclose the anti-vibration element or engage the cylindrical side wall of the anti-vibration element so that the lower region of the anti-vibration element, which forms the contact face of the depth stop, projects freely in the direction of the drill. In this last-mentioned embodiment, the depth stop has a soft contact face, as in the embodiment without an enclosing casing, whereby the wall surface is particularly well protected.

According to a further development of the invention, the depth stop comprises a resilient, cup-shaped anti-vibration element having a side wall engaging over a collar formed on the drill shank, and a base with a through-opening through which the drill shank extending from the collar to the drill tip, passes. The anti-vibration element can simply be pushed over the drill tip up to the collar along the drill shank. The side wall of the anti-vibration element which engages over the collar, can be pushed over the collar by applying little pressure. The anti-vibration element may also be manufactured as a one-piece part from a resilient plastic material, for example, from polyurethane.

To reduce or avoid friction losses between the collar and the base of the anti-vibration element, a bearing washer that is arranged between the collar and the base inside the space enclosed by the anti-vibration element, can be pushed onto the drill shank.

The invention both as to its construction so to its mode of operation, together with additional objects and advantages thereof, will be best understood from the following detailed description of preferred embodiments with reference to the accompanying drawing.

BRIEF DESCRIPTION OF THE DRAWINGS

FIG. 1 shows an elevation view of a first embodiment of a drill according to the invention with an anti-vibration element;

FIG. 2 shows a partially cross-sectional elevation view of a second embodiment of a drill according to the invention with a casing engaging over the anti-vibration element;

FIG. 3 shows a partial cross-sectional view of a further embodiment of a drill according to the invention with a casing engaging the anti-vibration element laterally; and FIG. 4 shows a partially cross-sectional elevational view of a further embodiment of a drill bit according to the invention with a depth stop formed as a resilient, cup-shaped anti-vibration element.

DETAILED DESCRIPTION OF THE PREFERRED EMBODIMENTS

The drill bit 1 illustrated in FIG. 1 has a collar 2 integrally formed with the drill shank, and a bearing washer 3 that engages the collar 2. An anti-vibration element 4 is arranged beneath the washer 3. The anti-vibration element is formed as a washer made of a resilient plastic material.

The drill 1 has a drill tip 5 with lateral cutting edges 6, 7 projecting laterally beyond the drill shank. The cutting edges serve in a manner, known per se, to produce an undercut at the bottom of a drilled hole. The drill shank has a bulge 8 which is located inside the drilled hole and defines a pivot point when the undercut is reamed out. The widest point 9 of the bulge 8 engages the wall of the drilled hole, and the drill is swivelled about this point which constitutes the pivot point.

The collar 2, the bearing washer 3 and the anti-vibration element 4 together form a depth stop 10 which defines the maximum depth to which the drill 1 can penetrate into masonry. As soon as the anti-vibration element 4 engages with its contact surface 11 the wall surface 12 of the masonry 13, the drill 1, which is chucked in a hammer drill means, not shown, can be swivelled laterally in order to ream out the undercut 14 at the bottom of the drilled hole. Through the swivelling movement, the collar 2 is inclined correspondingly towards alternate sides with the anti-vibration element 4 undergoing a slight resilient deformation. The contact surface 11 of the anti-vibration element lies against the wall surface 12 along its entire surface.

The drill 1 shown in FIG. 2 includes a depth stop 10 which consists of a collar 2, a bearing washer 3, an anti-vibration element 4, and a casing 15 engaging over the anti-vibration element 4 and the collar 2. The casing 15 has an upper through-opening 16 and a lower through-opening 17 through which the drill shank extends and is closed at sides.

In FIG. 3, the depth stop 10 also includes a casing 18, the lower edge 19 of which is bent inward and engages the cylindrical side wall of the anti-vibration element 4 laterally.

The bearing washer 3 is a metal washer, but a washer made of a plastic material with good sliding properties can also be used.

The drill 1 shown in FIG. 4 includes a depth stop 10 formed as a resilient, cup-shaped anti-vibration element 20. A collar 21 formed integrally with the drill shank supports the element 20. In the space between a base 22 of the anti-vibration element 20 and the collar 21, there is provided a bearing washer 23, which can be formed of metal or a plastic material with good sliding properties. The anti-vibration element 20 is made of a resilient plastic material as a one-piece, approximately frusto-conical part.

The base 22 of the anti-vibration element 20 has a through-opening 24 through which the drill shank with drilling dust grooves 25 and the drill tip 26 projects downward. The side wall 27 of the element 20 tapers upwardly as the peripheral face of the collar 21. The tapering peripheral face of the collar 21 has the same inclination as the tapering surface of the side wall 27 of the anti-vibration element 20.

The upper part of the shank of drill 1 can be secured in hammer drill means, not shown or in a similar apparatus. When the anti-vibration element 20 is positioned against a wall surface, the shocks transferred from the hammer drill means to the drill shank are absorbed so well that damage to the wall surface in the region of the mouth of the drilled hole is reliably avoided.

While the invention has been illustrated and described with reference to specific embodiments of a drill with a depth stop, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drill for producing drilled holes in masonry, comprising a drill shank; and a depth stop mounted on said shank and comprising a resilient anti-vibration element; a drill bit tip having lateral cutting edges projecting laterally beyond said shank; bulge means formed on said shank between said resilient anti-vibration element and said drill tip; a collar formed on said shank above said resilient anti-vibration element; and a bearing washer arranged between said collar and said resilient, anti-vibration element, said resilient anti-vibration element being ring-shaped and abutting said bearing washer.

2. A drill as set forth in claim 1, further comprising a casing arranged over said collar and engaging said resilient anti-vibration element.

3. A drill as set forth in claim 2, wherein said casing is mounted over said resilient anti-vibration element.

4. A drill as set forth in claim 2, wherein said resilient anti-vibration element has a side wall, said casing having end means laterally engaging said side all in such a manner that said resilient anti-vibration element has a lower portion projecting in a direction toward said drill tip beyond said casing.

5. A drill as set forth in claim 3, wherein said resilient anti-vibration element being formed as a cup having a side wall engaging over said collar, and a base having a through-opening through which said drill shank extends.

6. A drill as set forth in claim 5, wherein said cup has a contour of a truncated cone.

7. A drill as set forth in claim 5, wherein said side wall and said collar have conical peripheral surfaces.

8. A drill as set forth in claim 7, further comprising a bearing washer located between said base and said collar.

* * * * *